United States Patent [19]

Leonard

[11] 4,247,524
[45] Jan. 27, 1981

[54] PREPARATION OF ZEOLITE A BY HYDROTHERMAL TREATMENT OF CLINOPTILOLITE

[75] Inventor: John J. Leonard, Springfield, Pa.

[73] Assignee: Atlantic Richfield Company, Los Angeles, Calif.

[21] Appl. No.: 80,609

[22] Filed: Oct. 1, 1979

[51] Int. Cl.³ .............................................. C01B 33/28
[52] U.S. Cl. .................................... 423/118; 423/329
[58] Field of Search ................ 423/118, 328–330; 252/455 Z

[56] References Cited

U.S. PATENT DOCUMENTS

| 3,101,251 | 8/1963 | Howell | 423/118 |
| 3,114,603 | 12/1963 | Howell | 423/118 |
| 3,733,390 | 5/1973 | Robson | 423/118 |
| 3,852,411 | 12/1974 | Maness | 423/118 X |

Primary Examiner—Edward J. Meros
Attorney, Agent, or Firm—Delbert E. McCaslin

[57] ABSTRACT

A process for producing zeolite A of the formula $$Na_x(AlO_2)_x(SiO_2)_y \cdot ZH_2O$$

wherein $x=10$ to 14, $y/x=0.8$ to 1.2 and $Z=1$ to 30, which comprises heating at a temperature of 60° to 150° C. an aqueous slurry comprising (a) at least one gram of clinoptilolite of the formula $$Na_x(AlO_2)_x(SiO_2)_y \cdot ZH_2O$$

wherein $x=5$ to 7, $y/x=4.5$ to 5.5 and $Z=1$ to 30, per 100 cc of slurry, (b) at least a stoichiometric amount of sodium aluminate, and (c) at least 1% by weight of sodium hydroxide until zeolite A forms and recovering zeolite A. Sodalite which may have the formula $$Na_6(AlO_2)_6(SiO_2)_6 \cdot 2NaCl$$

can be produced by carrying out the aforesaid process in the presence of sodium chloride.

7 Claims, No Drawings

PREPARATION OF ZEOLITE A BY HYDROTHERMAL TREATMENT OF CLINOPTILOLITE

BACKGROUND OF THE INVENTION

Zeolites or molecular sieves are three-dimensional crystalline alumina-silicates with internal pore structure having both cation exchange capacity and adsorption capacity. The cation exchange capacity of zeolites is related to the aluminum content and pore size, the aluminum atom carrying a unit negative charge in the crystalline framework and thus determining the cation exchange capacity. If the hydrated radius of a cation is too large for diffusion through the pores, then exchange capacity and rate for that cation will be low. The adsorption capacity of zeolites is related to the pore size and the size of the adsorbate molecule. Materials which can be diffused into the pores will be adsorbed while larger ones will not.

Zeolites may be synthesized from concentrated silica-alumina gels under basic conditions such as described in U.S. Pat. No. 2,882,243. According to U.S. Pat. No. 3,663,165, a zeolite molecular sieve catalyst has been synthesized from kaolin clay by calcining the kaolin at 1800° F. for 2 hours to form m-kaolin followed by two treatments with aqueous sodium hydroxide. The first treatment is carried out at 100° F. for 12 hours while the second is carried out at 180° F. for 12 hours.

Certain zeolites do occur as mineral deposits in certain parts of the world. These mineral zeolites are usually found with varying amounts of other impurities and generally have low aluminum content. A particularly abundant mineral or natural zeolite is clinoptilolite having the formula $Na_x(AlO_2)_x(SiO_2)_y \cdot ZH_2O$ wherein $x = 5$ to 7, $y/x = 4.5$ to 5.5 and $Z = 1$ to 30.

According to a Russian article by A. Yu. Krupennikova, et al published by The P. G. Melikishvili Institute of Physical and Organic Chemistry of the Academy of Sciences of the Georgian S.S.R. and entitled Phase Transitions in the Recrystallization of Clinoptilolite, clinoptilolite has been subjected to caustic treatment to produce sodalite or phillipsite apparently in accordance with the equation:

$$2Na_6(AlO_2)_6(SiO_2)_{30} \cdot 24H_2O + 96NaOH(Aq) \rightarrow Na_{12}(AlO_2)_{12}(SiO_2)_{12} \cdot 27H_2O + 48Na_2SiO_3(Aq) + 69H_2O \quad (I)$$

As is apparent, reaction (I) suffers from a dramatic weight loss and is more suitable for the production of $Na_2SiO_3$. In fact, each pound of clinoptilolite introduced into the process produces but 0.4 pounds of zeolite A and for each pound of zeolite A produced there is an accompanying 0.57 pound of water which must be vaporized in order to isolate zeolite A.

It is a principle object of the present invention to provide a relatively simple process which produces zeolite A from clinoptilolite while achieving a high yield of zeolite A per pound of clinoptilolite introduced into the process and requiring removal of a minimal amount of water in order to isolate the zeolite.

BRIEF DESCRIPTION OF THE INVENTION

The present invention relates to a process for producing zeolite A of the formula $$Na_x(AlO_2)_x(SiO_2)_y \cdot ZH_2O$$

wherein $x = 10$ to 14, $y/x = 0.8$ to 1.2 and $Z = 1$ to 30, which comprises heating at a temperature of 60° to 150° C. an aqueous slurry comprising (a) at least one gram of clinoptilolite of the formula $$Na_x(AlO_2)_x(SiO_2)_y \cdot ZH_2O$$

wherein $x = 5$ to 7, $y/x = 4.5$ to 5.5 and $Z = 1$ to 30, per 100 cc of slurry, (b) at least a stoichometric amount of sodium aluminate, and (c) at least 1% by weight of sodium hydroxide until zeolite A forms and recovering zeolite A.

The process of the present invention may proceed, for example, in accordance with the following postulated equation:

$$2Na_6(AlO_2)_6(SiO_2)_{30} \cdot 24H_2O + 48NaAl(OH)_4 \rightarrow 5Na_{12}(AlO_2)_{12}(SiO_2)_{12} \cdot 27H_2O + 9H_2O \quad (II)$$

Reaction (II) depicting a typical reaction within the present invention, does not suffer from a dramatic weight loss and does not produce a major amount of another product. Each pound of clinoptilolite introduced into the process produces two pounds of zeolite A and there is but 0.014 pound of water produced per pound of zeolite A. Accordingly, isolation of the zeolite from water is not a troublesome problem.

DETAILED DESCRIPTION OF THE INVENTION

In accordance with the present invention, an aqueous slurry comprising (a) at least one gram of clinoptilolite per 100 cc of slurry, (b) at least a stoichiometric amount of sodium aluminate and (c) at least 1% by weight of sodium hydroxide is heated until zeolite A forms and zeolite A is then recovered.

The temperature of heating the aqueous slurry may range from about 60° to 150° C. and is preferably from 80° to 100° C.

The time of heating in accordance with the present invention is determinative of the extent of clinoptilolite conversion to zeolite A and depends upon the choice of temperature and ratio of reactants. Generally, the time ranges from about 15 minutes to 7 hours and preferred conditions involve a time of from 1 to 4 hours.

The slurry should contain at least one gram of clinoptilolite per 100 cc of slurry so as to achieve reasonable yields of zeolite A per volume of slurry heated. The upper limit of clinoptilolite present in the slurry is not critical. However, the amount present should not be so great as to afford an unworkable viscosity. Generally, the clinoptilolite content of the slurry will range from about 1 to 32 grams of clinoptilolite per 100 cc of slurry and preferably it ranges from about 8 to 16 grams per 100 cc of slurry.

The amount of sodium hydroxide present in the slurry should be at least 1% by weight in order to achieve a reasonable yield and generally ranges from about 1 to 25% by weight, preferably from 5 to 15% by weight.

Once zeolite A has been formed which may be determined by X-ray diffraction studies, the precipitated zeolite A may be recovered by means such as filtration. Subsequently, it may be water washed and then dried. Drying may be carried out at room temperature or at elevated temperature.

Sodalite which may have the formula $Na_6(AlO_2)_6(SiO_2)_6 \cdot 2NaCl$ can be produced by the process of the present invention by adding sodium chloride to the aqueous slurry of the present invention. Examples illustrating the preparation of sodalite are included hereinafter.

The following examples illustrate the production of zeolite A and the production of sodalite but are not limiting to the scope of the invention which is set forth in the claims.

EXAMPLE 1

A solution was prepared by dissolving 100 g of sodium hydroxide and 41 g of sodium aluminate in 859 g of water to give 10 weight percent sodium hydroxide and 4.1 weight percent sodium aluminate. Three hundred cc of this solution were introduced into a 500 cc round bottom flask equipped with a mechanical stirrer, 12.0 g of clinoptilolite were added and the flask was heated in an oil bath at 95° C. for 2 hours. The hot slurry was then filtered to give 21.6 g of zeolite A upon air drying at 25° C. This corresponds to 180 weight percent recovery based on clinoptilolite. The product was identified by X-ray diffraction and elemental analysis.

EXAMPLES 2-4

The above procedure was repeated at the temperatures and times shown below to give the indicated recovery of zeolite A.

| Example | Temp. °C. | Time Hrs. | Weight Percent Recovery of Zeolite A |
|---|---|---|---|
| 2 | 95 | 2 | 180 |
| 3 | 95 | 0.5 | 113 |
| 4 | 95 | 4.5 | 186 |

EXAMPLE 5

A solution was prepared by dissolving 100 g of sodium hydroxide and 82 g of sodium aluminate in 818 g of water to give 10 weight percent sodium hydroxide and 8.2 weight percent sodium aluminate. Twenty-four g of clinoptilolite and 300 cc of this solution were added to a 500 cc flask as described in Example 1. After 2 hrs. with stirring at 95° C., 43.2 g of zeolite A was recovered (180 weight percent) after filtration and air drying at 25° C.

EXAMPLES 6-13

The above procedure was repeated at the times and temperatures shown below to give the indicated weight percent recoveries.

| Example | Temp. °C. | Time Hrs. | Weight Percent Recovery of Zeolite A |
|---|---|---|---|
| 6 | 95 | 0.5 | 135.4 |
| 7 | 95 | 1.0 | 168.9 |
| 8 | 95 | 2.0 | 187.5 |
| 9 | 95 | 4.0 | 195.0 |
| 10 | 80 | 1.0 | 118.8 |
| 11 | 80 | 2.0 | 143.1 |
| 12 | 80 | 4.0 | 172.7 |
| 13 | 80 | 7.0 | 190.0 |

EXAMPLES 14-21

A solution was prepared by dissolving 100 g of sodium hydroxide and 164 g of sodium aluminate in 736 g of water to give 10 weight percent NaOH and 16.4 weight percent sodium aluminate. Forty-eight g of clinoptilolite and 300 cc of this solution were added to a 500 cc flask as described in Example 1. After heating and stirring at the below indicated temperatures and times, the indicated weight percent recoveries of zeolite A were obtained.

| Example | Temp. °C. | Time Hrs. | Weight Percent Recovery of Zeolite A |
|---|---|---|---|
| 14 | 95 | 0.5 | 128.5 |
| 15 | 95 | 1.0 | 169.2 |
| 16 | 95 | 2.0 | 190.0 |
| 17 | 95 | 4.0 | 195.0 |
| 18 | 80 | 1.0 | 134.0 |
| 19 | 80 | 2.0 | 147.0 |
| 20 | 80 | 4.0 | 182.0 |
| 21 | 80 | 7.0 | 193.0 |

EXAMPLES 22-25

The procedure of Example 1 was repeated with varying amounts of sodium hydroxide as indicated below. After 4 hours of stirring at 95° C., the indicated recoveries were obtained.

| Example | Weight Percent Sodium Hydroxide | Weight Percent Recovery |
|---|---|---|
| 22 | 1.0 | 101 |
| 23 | 5.0 | 158 |
| 24 | 10.0 | 180 |
| 25 | 15.0 | 185 |

EXAMPLES 26-28

The following examples illustrate the formation of sodalite in the presence of sodium chloride. The sodalite product was identified by X-ray diffraction. The procedure of Example 1 was followed but the solution contained the indicated amount of sodium chloride.

| Example | Weight Percent Sodium Chloride | Temp. °C. | Time Hrs. | Weight Percent Recovery of Sodalite |
|---|---|---|---|---|
| 26 | 6.1 | 120 | 2.0 | 178 |
| 27 | 1.5 | 95 | 2.0 | 178 |
| 28 | 0.75 | 95 | 2.0 | 179 |

What is claimed is:

1. A process for producing zeolite A of the formula $Na_x(AlO_2)_x(SiO_2)_y \cdot ZH_2O$ wherein x=10 to 14, y/x=0.8 to 1.2 and Z=1 to 30, which comprises heating at a temperature of 60° to 150° C. an aqueous slurry comprising
(a) from about 1 to 32 grams of natural clinoptilolite of the formula $Na_x(AlO_2)_x(SiO_2)_y \cdot ZH_2O$ wherein x=5 to 7, y/x=4.5 to 5.5 and Z=1 to 30, per 100 cc of slurry,
(b) a stoichiometric amount of sodium aluminate, and (c) from about 1 to 25% by weight of sodium hydroxide in water until zeolite A forms and recovering zeolite A.

2. The process of claim 1 wherein said temperature is from 80° to 100° C.

3. The process of claim 1 wherein said heating is carried out for 15 minutes to 7 hours.

4. The process of claim 1 wherein said heating is carried out for 1 to 4 hours.

5. The process of claim 1 wherein said slurry contains from 5 to 15% by weight of sodium hydroxide in water.

6. A process for producing zeolite A of the formula $$Na_{12}(AlO_2)_{12}(SiO_2)_{12}.27H_2O$$

which comprises heating at a temperature of 60° to 150° C. an aqueous slurry comprising (a) from about 1 to 32 grams of natural clinoptilolite of the formula $$Na_6(AlO_2)_6(SiO_2)_{30}.24H_2O$$

per 100 cc of slurry, (b) a stoichiometric amount of sodium aluminate, and (c) from about 1 to 25% by weight of sodium hydroxide in water until said zeolite A forms and recovering said zeolite A.

7. A process according to claims 1 or 8 wherein said slurry contains from 8 to 16 grams of natural clinoptilolite per 100 cc of slurry.

* * * * *